(12) United States Patent
Lyon et al.

(10) Patent No.: US 9,925,484 B2
(45) Date of Patent: Mar. 27, 2018

(54) METHOD FOR SEPARATING SAND FROM A HYDROCARBON STREAM

(71) Applicant: Sable Sand Solutions Inc., Calgary (CA)

(72) Inventors: Bruce Lyon, Airdrie (CA); Gordon McIntosh, Bakersfield, CA (US)

(73) Assignee: SABLE SAND SOLUTIONS INC., Calgary (CA)

( * ) Notice: Subject to any disclaimer, the term of this patent is extended or adjusted under 35 U.S.C. 154(b) by 0 days.

(21) Appl. No.: 15/445,934

(22) Filed: Feb. 28, 2017

(65) Prior Publication Data

US 2017/0165598 A1      Jun. 15, 2017

Related U.S. Application Data

(62) Division of application No. 14/188,510, filed on Feb. 24, 2014, now Pat. No. 9,616,431.

(60) Provisional application No. 61/769,039, filed on Feb. 25, 2013.

(51) Int. Cl.

| | |
|---|---|
| *B01D 19/00* | (2006.01) |
| *B01D 45/12* | (2006.01) |
| *B04C 5/04* | (2006.01) |
| *B04C 5/085* | (2006.01) |
| *B04C 5/103* | (2006.01) |
| *B04C 5/13* | (2006.01) |
| *B04C 5/14* | (2006.01) |
| *E21B 43/34* | (2006.01) |

(52) U.S. Cl.
CPC ............... *B01D 45/12* (2013.01); *B04C 5/04* (2013.01); *B04C 5/085* (2013.01); *B04C 5/103* (2013.01); *B04C 5/13* (2013.01); *B04C 5/14* (2013.01); *E21B 43/34* (2013.01)

(58) Field of Classification Search
None
See application file for complete search history.

(56) References Cited

U.S. PATENT DOCUMENTS

| | | |
|---|---|---|
| 3,232,430 A | 2/1966 | Camille |
| 3,349,548 A | 10/1967 | Boyen |
| 3,960,734 A | 6/1976 | Zagorski |
| 3,988,132 A | 10/1976 | Oranje |
| 4,344,774 A | 8/1982 | Skipper |
| 5,224,976 A | 7/1993 | Oranje |

(Continued)

FOREIGN PATENT DOCUMENTS

WO      2013117342 A1      8/2013

OTHER PUBLICATIONS

Translation of WO2013117342A1, accessed Jul. 6, 2016.
(Continued)

*Primary Examiner* — Amber R Orlando
*Assistant Examiner* — Phillip Y Shao
(74) *Attorney, Agent, or Firm* — Franklin & Associates International Inc.; Matthew F. Lambrinos

(57) ABSTRACT

A method for separating solid and liquid components from gas components in a hydrocarbon production stream. The method includes the steps of: conveying the production stream into a cylindrical vessel having an inner cavity; creating an initial drop in velocity of the production stream; directing the production stream to flow around the inner cavity; collecting the gas components from the production stream at a top end of the vessel; and collecting the solid and liquid components at a drain in a bottom end of the vessel.

16 Claims, 4 Drawing Sheets

(56) References Cited

U.S. PATENT DOCUMENTS

| | | |
|---|---|---|
| 5,338,341 A | 8/1994 | Mazzei |
| 5,755,965 A | 5/1998 | Reiber |
| 6,019,825 A | 2/2000 | Greene |
| 6,251,296 B1 | 6/2001 | Conrad |
| 6,811,709 B2 | 11/2004 | Arnaud |
| 6,866,703 B2 | 3/2005 | Mazzei |
| 7,144,503 B2 | 12/2006 | Oserod |
| 7,655,078 B2 | 2/2010 | Saito |
| 7,785,400 B1 | 8/2010 | Worley et al. |
| 8,366,809 B2 | 2/2013 | Rollins |
| 2006/0236663 A1 | 10/2006 | Oh |
| 2010/0064893 A1 | 3/2010 | Hopper |
| 2011/0185894 A1 | 8/2011 | Olsson |
| 2014/0243571 A1 | 8/2014 | Lyon et al. |

OTHER PUBLICATIONS

Office Action in U.S. Appl. No. 14/188,510 dated Jul. 14, 2016.
U.S. Appl. No. 61/769,039, filed Feb. 25, 2013.
Notice of Allowance dated Nov. 30, 2016 in U.S. Appl. No. 14/188,510.

METHOD FOR SEPARATING SAND FROM A HYDROCARBON STREAM

CROSS-REFERENCE TO RELATED APPLICATIONS

This application is a divisional of U.S. patent application Ser. No. 14/188,510 filed on Feb. 24, 2014, which claims the benefit under 35 U.S.C § 119(e) of U.S. provisional patent application No. 61/769,039, which was filed on Feb. 25, 2013. Each application identified above is incorporated herein by reference in its entirety to provide continuity of disclosure.

FIELD OF THE INVENTION

The invention relates to an apparatus for separating sand from a natural gas production stream during hydrocarbon well operations. More specifically, the invention relates to a sand separator having an interior space comprising an inner cone with one-way gas vents, wherein when a production stream enters the interior space, the sand and liquid particles are separated from the gaseous particles.

BACKGROUND OF THE INVENTION

As is well known and by way of background, natural gas is a naturally occurring hydrocarbon gas mixture consisting primarily of methane, up to 20% other hydrocarbons as well as varying amounts of impurities such as carbon dioxide. Natural gas is widely used as an energy source and it is generally found in deep underground natural rock formations or associated with other hydrocarbon reservoirs. The underground rock formations or subsurface reservoirs of hydrocarbons typically consist of a porous layer, such as limestone and sand, overlaid by a nonporous layer. The porous layer forms a reservoir in which hydrocarbons are able to collect. To recover hydrocarbons, wells are drilled from the surface of the earth through the nonporous layers overlying the reservoir to tap into the reservoir and allow the hydrocarbons to flow from the porous formation into the well. The hydrocarbons, including oil and natural gas, are then recovered at the earth's surface where they undergo further processing.

Recovering natural gas is often not as straightforward as it appears, as the gas may not readily flow from the reservoir into the well bore as a result of a variety of factors including formation characteristics and pressures. As such, as is well known in order to increase gas flow and recovery, many methods are employed as means of increasing natural gas production including horizontal drilling and hydraulic fracturing, or "fracing". Horizontal drilling, as opposed to vertical drilling, involves drilling a well more or less horizontally through a reservoir to increase the exposure of the formation to the wellbore, thereby decreasing the distance the gas must travel to the wellbore.

Hydraulic fracturing involves pumping high pressure fluids and sand into the reservoir in order to open up the formation by fracturing the rock in the reservoir. After the pressure is released, the sand remains in the fracture to create a higher permeability flow path towards the well.

Horizontal drilling and hydraulic fracturing are generally effective at increasing the recovery of hydrocarbons, however they also create additional challenges that must be dealt with. Specifically, large quantities of fluid, sand and other additives are introduced into the formation and mixed with the hydrocarbons during fracturing. After the fracing stimulation of the well, introduced fracing sand and naturally occurring reservoir fines or sand and/or fracing sands can be produced back into the horizontal well along with any remaining fluids, natural gas and other reservoir fluids. This particulate is produced to the surface and can cause plugging and/or erosion of surface equipment and pipelines.

To remove sand from natural gas at the surface, apparatuses commonly referred to as sand separators are used. Typically a sand separator comprises a vessel with an inlet port and a gas outlet port on the upper part of the vessel, and a drain at the bottom of the vessel. In addition, this vessel may or may not include secondary filters. The inside of the vessel is formatted such that when a high pressure, high velocity production stream from a well flows into the vessel through the inlet port, it experiences a large drop in velocity, causing the natural gas to separate from the water and sand. The vertical divider forces the fluid and sand down towards the drain, while the gas rises back up around the divider and exits through the gas outlet port.

While past sand separators can be effective, they are often limited by a number of operational limitations in the field. For example, the flow rate of gas and water/sand into a sand separator may be varied where the velocity of gas and the volume of water/sand may fluctuate significantly as it enters the sand separator. In particular, in the event that a sudden pulse in water/sand is encountered, in past designs, this may lead to either ineffective water/sand separation from the gas, clogging of the sand filters of the separator and/or damage to the sand filters. An example of a past sand separator is described in U.S. Pat. No. 7,785,400. As a result, there has been a need for systems that effectively allow for a greater residence time of water/sand within the separator that enables a more efficient separation of water/sand from gas without leading to clogging problems.

SUMMARY OF THE INVENTION

In accordance with the invention, there is provided a separator for separating solid and liquid components from gas components in a hydrocarbon production stream, the separator comprising: a cylindrical body having an upper end, a lower end, a body wall and an inner cavity; an inlet pipe having a first and second end and extending through the body wall, wherein the first end is on the outside of the body and the second end extends to within the inner cavity; a gas outlet port on the upper end of the body; a drain near the lower end of the body; and an inner vessel fastened in the inner cavity of the body, the inner vessel having a vessel wall, a vessel cavity, and a plurality of openings in the vessel wall wherein solid and liquid components of a hydrocarbon production stream entering the cylindrical body are preferentially directed to the drain and gas components are preferentially directed to the gas outlet port.

In a further embodiment, the inner vessel is cone-shaped having a wider upper end in relation to a narrower lower end.

In one embodiment, each of the plurality of openings in the vessel wall includes one-way gas vents. Each gas vent may include a cap partially covering each opening.

In another embodiment, the separator includes a stationary auger operatively connected to an inner surface of the body wall and operatively positioned between the inner vessel and the inner surface of the body wall. Preferably, the auger is separated from the inner vessel by a gap and/or has an inwardly and downwardly sloping surface.

In another embodiment, the separator includes a wear plate fastened to the body wall in the inner cavity adjacent the second end of the inlet pipe.

In yet another embodiment, the inner vessel further comprises at least one inwardly projecting ledge extending around the vessel wall within the vessel cavity.

In another aspect, the invention, provides a method for separating solid and liquid components from gas components in a hydrocarbon production stream comprising the steps: a) transporting the production stream into a cylindrical vessel; b) creating an initial drop in velocity of the production stream; c) directing the production stream flow around an inner cavity of the cylindrical vessel; d) collecting the gas components from the production stream at a top end of the vessel; and e) collecting the sand and liquid components at a bottom end of the vessel.

BRIEF DESCRIPTION OF THE DRAWINGS

The invention is described with reference to the accompanying figures in which.

DETAILED DESCRIPTION OF THE INVENTION

Figure 1:
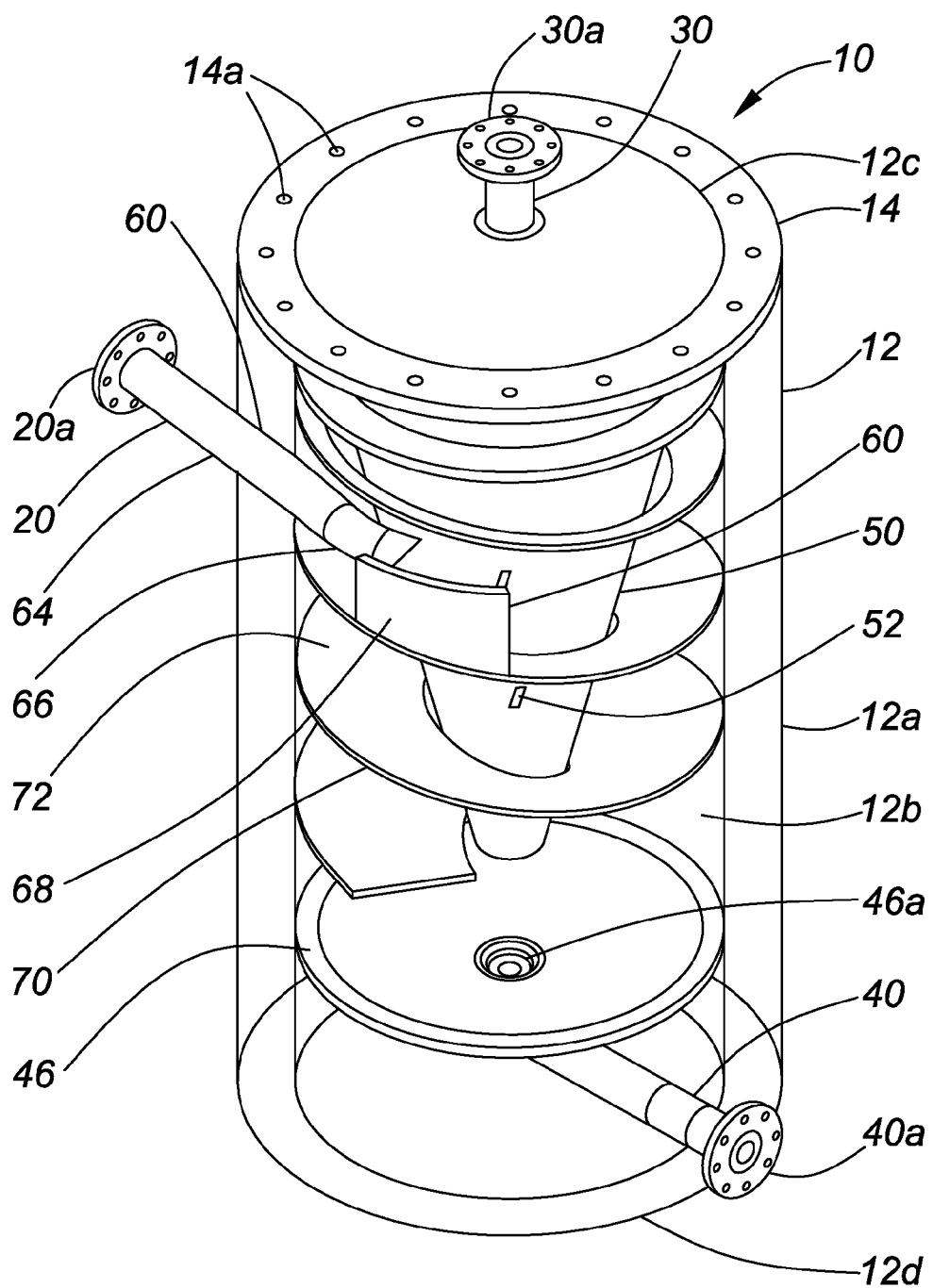
FIG. 1 is a front perspective cutaway view of a sand separator in accordance with one embodiment of the invention.

With reference to the figures, a sand separator 10 is described. The sand separator generally comprises a vessel 12 having an inlet pipe 20, a gas outlet pipe 30 and a drain 40. The interior of the sand separator comprises a collecting plate 46, an inner cone 50, a wear plate 60, and an auger 70. The sand separator is described herein with typical dimensions and as being manufactured from specific materials. It is understood, however, that variations in the dimensions and materials may be made while achieving the objectives of the invention as understood by those skilled in the art.

Vessel

Figure 2:
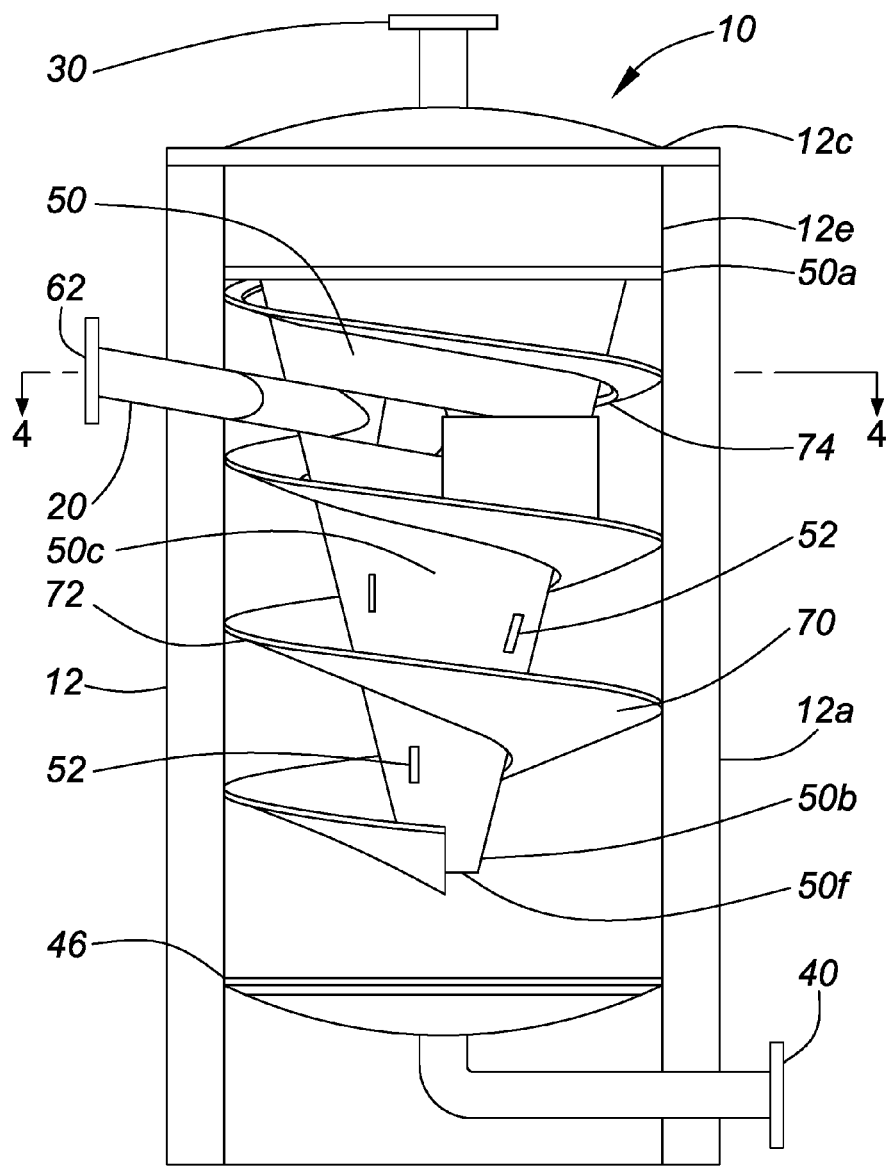
FIG. 2 is a front cutaway view of a sand separator in accordance with one embodiment of the invention.

Referring to FIGS. 1 and 2, the vessel 12 is preferably a cylindrical shaped hollow vessel having an outer wall 12a, inner cavity 12b, top end 12c, bottom end 12d. The external dimensions of the vessel are typically about 3 to 6 feet in diameter and 6 to 10 feet in height. The outer wall 12a, top end 12c and bottom end 12d of the vessel are fabricated from rolled steel and are of sufficient thickness to accommodate an internal pressure of up to 5000 psi. The top end 12c of the vessel has a flange 14 with a plurality of bolt holes 14a for attachment to a pipe or other device. The bottom end 12d of the vessel is secured to a stand or legs for support (not shown).

The vessel 12 comprises three ports from the outside of the sand separator to the inner cavity 12b: the inlet pipe 20 located in the top half of the outer wall 12a; the gas outlet pipe 30 located on the top end 12c of the vessel; and the drain 40 located on the bottom end 12d of the vessel. Each pipe port is moveable between an open and closed position and has a flange 20a, 30a, and 40a for fastening to complimentary pipes, hoses or other conveyance devices.

Inner Cone

Figure 3:
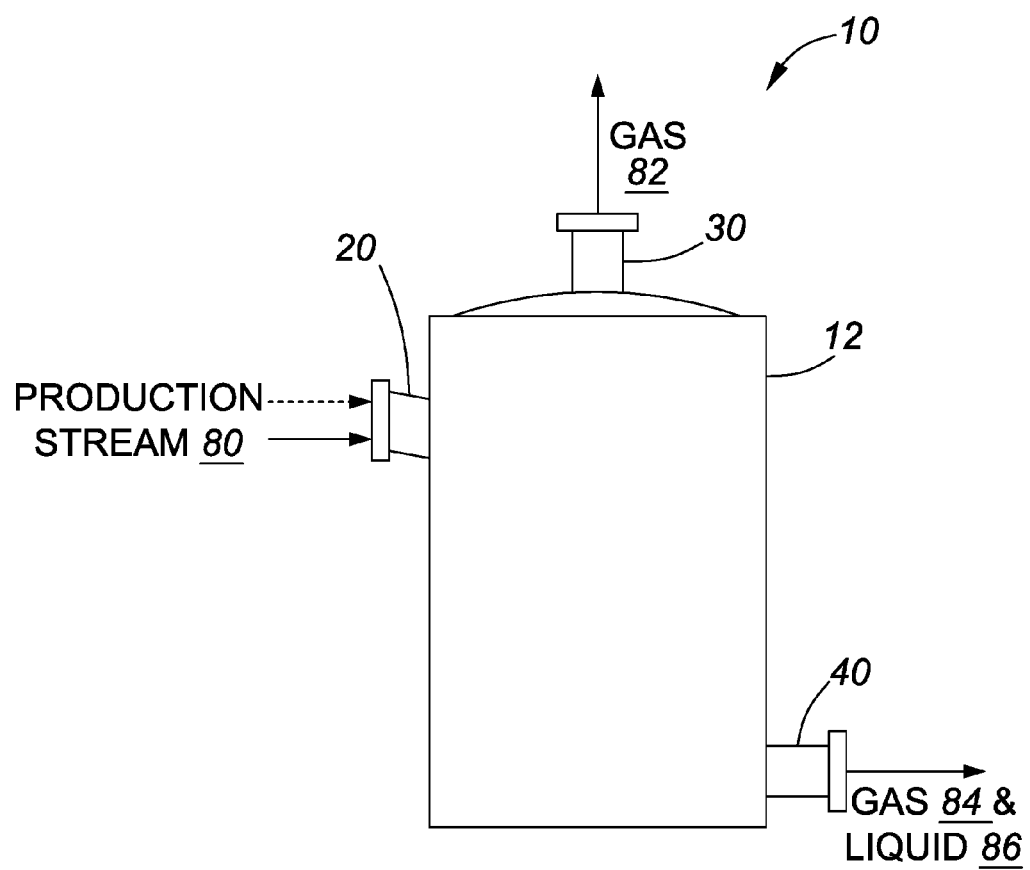
FIG. 3 is a front view of a sand separator in accordance with one embodiment of the invention.
Figure 4:
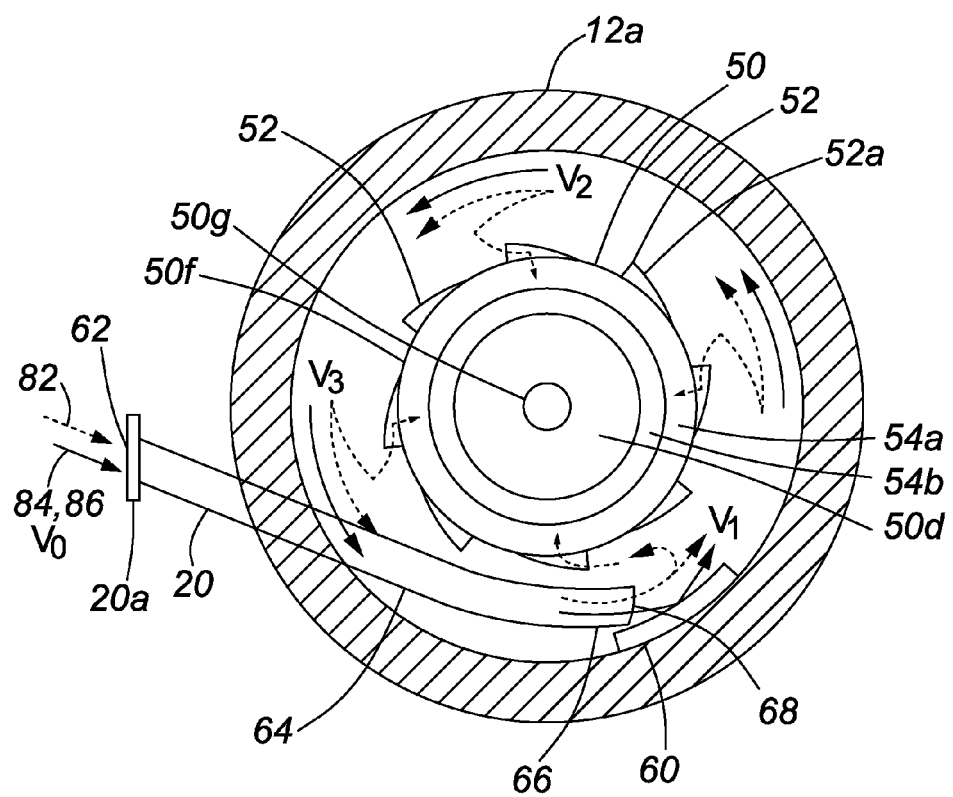
FIG. 4 is a top cross-sectional view of the sand separator taken at line '4-4' of FIG. 2 in accordance with one embodiment of the invention.

Referring to FIGS. 2, 3 and 4, the inner cone 50 is located in the inner cavity 12b of the vessel and comprises an upper end 50a, a lower end 50b, a cone wall 50c and a cone cavity 50d. The upper end 50a of the cone is connected to an inner surface 12e of the top end 12c of the vessel. There is a continuous path between the cone cavity 50d and the gas outlet pipe 30. The lower end 50b of the cone has an opening 50f to allow sand and liquid to drain from the cone cavity.

The cone wall 50c includes a plurality of reverse entry gas vents 52 that allow gases to flow into the cone cavity 50d while obstructing the flow of particulates from entering the cone cavity 50d. The gas vents 52 preferably include a cap 52a covering each vent opening such that a change in direction is required for gas/solid/liquid to flow through each gas vent opening. In addition, each cap is preferably positioned in downwardly angled parallel rows in line with the angle of the inlet pipe 20.

On an inner surface 50g of the cone wall 50c, there is a first and second circular ledge 54a, 54b that protrudes inwardly from the inner surface of the cone wall and extends around the inner circumference of the cone wall slightly above a row of gas vents.

Collecting Plate

Referring to FIGS. 1 and 2, the collecting plate 46 is located near the bottom end of the interior of the vessel 12, spanning across the inner cavity to collect the sand particles and liquids that drop out of the production stream and direct them towards a channel 46a in the middle of the collecting plate. The channel connects to the drain 40 to allow the collected stream to flow out the vessel.

Inlet Pipe

Referring to FIG. 4, the inlet pipe 20 comprises a first opening 62, a body 64 having a curved tip 66 and a second opening 68. A wear plate 60 is fastened to the inner surface of the vessel near the curved tip 66 of the inlet pipe. The pipe body 64 is preferably positioned at a slight downward angle of approximately 10 degrees to the horizontal.

The body 64 of the inlet pipe is preferably made of a hard metal to withstand high levels of abrasion from the production stream 80 colliding with the inner walls of the body. The wear plate 60 protects the vessel wall from abrasion due to high-pressure high-speed particles hitting it continuously during use. When the wear plate is abraded to a certain extent, it can be removed and replaced quickly, thereby saving the whole vessel from being replaced and thereby saving time, money and labor.

Auger

Referring to FIGS. 1 and 2, the auger 70 is located around the inner cone 50 in the inner cavity 12b of the vessel 12. The auger 70 is stationary and comprises a surface 72 attached to the inner surface 12e of the vessel that spirals around the inner cone 50 and gets progressively wider from top to bottom, with a gap 74 located between the auger and inner cone.

Operation

As shown in FIG. 4, the production stream comprising gases 82 (dotted line), sand and other particulate matter 84, and liquids 86 (solid line), enters the vessel through the first opening 62 of the inlet pipe 20. The production stream enters the vessel with highly variable velocities that are determined by the gas production volumes and pressures, shown as $V_0$ in FIG. 4. The production stream flows through the body 64 of the pipe, around the curved tip 66 of the inlet, out the second opening 68, and collides with the wear plate 60. As the production stream exits the second opening, the volume available for the production stream is greatly expanded from the unit volume of the inlet pipe, thereby causing a large initial drop in the velocity of the production stream (designated as $V_1$). For example, high pressure fluids in a typical 2 inch diameter inlet pipe may enter the vessel at a location having a nominal 21 inch diameter which thereby results in an approximate 110 fold change in cross-sectional area at the point of transition which similarly results in a 110 fold change in flow velocity of the production stream.

Upon exiting the second opening and after impacting the wear plate, initially the lighter gas fractions due to their lower density and lower centrifugal forces acting on the lighter fractions will flow towards the gas vents 52. The heavier particles of sand and liquid, shown by the solid arrows, and the heavier gas fractions will be propelled around the inner walls of the vessel, where they continue to slow to velocities $V_2$ and $V_3$. Moreover, these fractions will also spiral downwards towards the bottom of the vessel due to impacting with the auger. The downward spiral direction is initiated by the downward angle and curved tip of the inlet pipe. Continued contact with the auger 70 continues to slow and direct the stream downwards as the stream spirals around the ledge 72 of the auger thus reducing the centrifugal forces on the gas/liquid fractions. The lower centrifugal forces on the gas fractions will continue to enable the gas fraction to enter the cone through gas vents 52 while the slowing liquids and solids will drop from suspension. Importantly, the gap 74 between the auger ledge and the inner cone as well as the inward slope of the auger prevents droplets/particles from collecting and/or stalling on the auger ledge and allows them to fall downwards towards the collector plate 46. The auger also minimizes the formation of a vortex in the vessel that might otherwise form if the velocity of gas/liquids is not slowed gradually.

When the gases flow through the gas vents 52 into the cone cavity 50d, depending on the relative velocities, some sand 84 and liquid 86 particles may not drop out of the production stream 80 and will flow with the gas through the gas vents. When the gas, sand and liquid stream flows through the gas vents, the stream will initially collide with the underside of the first and second ledge 54a, 54b, thereby creating a low velocity zone that causes substantially all of the carried-over sand and liquid particles to drop out of the gas stream and thereby fall down the cone where they drop or flow out of the opening 50f in the bottom of the cone onto the collecting plate 46. In contrast, the gas stream readily flows around the first and second ledge 54a, 54b, to exit the gas outlet pipe 30 at the top end of the vessel 12.

When the solid/liquid phases reach the bottom of the auger or the cone opening 50f, they fall onto the collecting plate 46, flowing through the channel 46a and out the drain 40. Typically large sand particles greater than 50 μm in diameter and most of the liquids are collected. The drain may be connected to a settlement tank wherein the sand and liquid particles are further separated for disposal.

Most of the gases from the production stream exit the vessel through the gas outlet pipe 30 and may be subjected to further separation techniques, such as a filtering device, downstream from the sand separator in order to remove any finer particulate matter.

The sand separator as described typically separates approximately 91% of the particulate matter (i.e. sand) from the production stream. The remaining particulate matter is typically smaller sand particles of less than 50 μm that can be, if required, filtered out downstream. Any remaining smaller particulate are less able to either plug or erode surface equipment.

System Advantages

The sand separator as described is able to effectively separate gas from production streams, especially high pressure, high velocity production streams that also comprise liquid and particulate phases. The gas component is mostly natural gas, whereas the liquid and particulate phases are primarily water and sand; however other solid/liquids may also be present. Production streams from the early stages of horizontal well fracturing can have initial pressures from 3000 to 5000 psi, and at times up to 10,000 psi. As such, the flow rates through typical 3 to 4 inch production lines can approach a million cubic feet per hour or more, resulting in extremely high velocities entering the vessel.

Importantly, the subject system has several advantages over conventional sand separators by providing effective surfaces to slow each of the gas, liquid and solid phases entering the system. As such, a more effective separation can be achieved with less solid/liquid carryover. That is, the subject design allows for a more controlled release of sand from the fast moving gas as the auger will more gradually decrease the velocity of the liquid/sand entering the separator such that the flow rate of separated liquid/sand is more consistent to the outlet. This is important in addressing sudden changes in flow rates of liquid/sand that may be encountered by the device.

In addition, the replaceable removable insert reduces the abrasion caused to the vessel from the particulate matter entering the vessel at high speeds, thereby prolonging the life of the vessel. Also, the removable insert is relatively inexpensive and easy to change, requiring only minimal labor and tools, and replacement can be performed on-site as needed without having to transport the sand separator.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for separating solid and liquid components from gas components in a hydrocarbon production stream, the method comprising the steps of:
   a) conveying the production stream into a cylindrical vessel having an inner cavity;
   b) creating an initial drop in velocity of the production stream;
   c) directing the production stream to flow around the inner cavity;
   d) collecting the gas components from the production stream at a top end of the vessel; and
   e) collecting the solid and liquid components at a drain in a bottom end of the vessel, wherein the inner cavity comprises a cone-shaped inner vessel with a downwardly directed apex and the flow around the inner cavity is a downward spiral flow induced by a stationary auger operatively connected to an inner sidewall of the inner cavity.

2. The method of claim 1, wherein the inner vessel comprises a plurality of openings, including one or more gas vent openings.

3. The method of claim 1, wherein the auger is positioned between the inner vessel and the inner sidewall of the inner cavity.

4. The method of claim 3, wherein the auger is separated from the inner vessel by a gap.

5. The method of claim 4, wherein the auger has an inwardly and downwardly sloping surface.

6. The method of claim 5, wherein the production stream is conveyed into the cylindrical vessel via an inlet pipe opening into the cylindrical vessel, and a wear plate is fastened to the inner sidewall in the inner cavity adjacent the opening into the cylindrical vessel.

7. The method of claim 6, wherein the wear plate is removable.

8. The method of claim 1, wherein a collecting plate is located above the drain, the collecting plate having a channel in fluid communication with the drain.

9. The method of claim 2 wherein the inner vessel further comprises at least one inwardly projecting ledge extending around the inner sidewall.

10. The method of claim 6, wherein the inlet pipe is angled downwards.

11. The method of claim 6, wherein the inlet pipe opening is curved inwardly.

12. A method for separating solid and liquid components from gas components in a hydrocarbon production stream, the method comprising the steps of:
conveying the production stream into a cylindrical vessel having an inner cavity;
creating an initial drop in velocity of the production stream by inducing a downward spiral flow of the production stream;
collecting the gas components from the production stream at a top end of the vessel; and
collecting the solid and liquid components at a drain in a bottom end of the vessel, wherein the downward spiral flow is induced by a stationary auger connected to an inner sidewall of the inner cavity.

13. The method of claim 12, wherein the inner cavity comprises a cone-shaped inner vessel with a downwardly directed apex.

14. The method of claim 13, wherein the inner vessel comprises a plurality of openings, including one or more gas vent openings.

15. The method of claim 12, wherein the auger has an inwardly and downwardly sloping surface and is positioned between the inner vessel and the inner sidewall of the inner cavity.

16. The method of claim 12, wherein the production stream is conveyed into the cylindrical vessel via a downward angled inlet pipe with an inwardly curved opening into the cylindrical vessel, and a wear plate is fastened to the inner sidewall in the inner cavity adjacent the opening into the cylindrical vessel.

* * * * *